(12) United States Patent
Kitamura et al.

(10) Patent No.: US 10,041,571 B2
(45) Date of Patent: Aug. 7, 2018

(54) TENSIONER

(71) Applicant: TSUBAKIMOTO CHAIN CO., Osaka-shi, Osaka (JP)

(72) Inventors: Satoshi Kitamura, Osaka (JP); Osamu Yoshida, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 349 days.

(21) Appl. No.: 14/941,793

(22) Filed: Nov. 16, 2015

(65) Prior Publication Data
US 2016/0153530 A1  Jun. 2, 2016

(30) Foreign Application Priority Data
Nov. 28, 2014 (JP) .................................. 2014-240777

(51) Int. Cl.
*F16H 7/08* (2006.01)
(52) U.S. Cl.
CPC ............. *F16H 7/08* (2013.01); *F16H 7/0836* (2013.01); *F16H 2007/0806* (2013.01); *F16H 2007/0812* (2013.01); *F16H 2007/0853* (2013.01); *F16H 2007/0872* (2013.01); *F16H 2007/0893* (2013.01)
(58) Field of Classification Search
CPC .. F16H 7/08; F16H 7/0836; F16H 2007/0806; F16H 2007/0812; F16H 2007/0853; F16H 2007/0872; F16H 2007/0893
See application file for complete search history.

(56) References Cited

U.S. PATENT DOCUMENTS

| | | | | |
|---|---|---|---|---|
| 4,792,322 A * | 12/1988 | Goppelt | .................... | F16H 7/08 474/136 |
| 6,045,471 A * | 4/2000 | Suzuki | ...................... | F16H 7/08 474/109 |
| 7,918,754 B2 * | 4/2011 | Kurematsu | ........... | F16H 7/0848 474/110 |
| 9,303,735 B2 * | 4/2016 | Kurematsu | ............... | F16H 7/08 |
| 9,541,174 B2 * | 1/2017 | Kurematsu | ............... | F16H 7/08 |
| 2007/0032323 A1 * | 2/2007 | Yoshida | ................ | F16H 7/0848 474/110 |
| 2009/0020088 A1 | 1/2009 | Fujii et al. | | |
| 2010/0298077 A1 * | 11/2010 | Hirayama | ................. | F01L 1/02 474/110 |

(Continued)

FOREIGN PATENT DOCUMENTS

| | | |
|---|---|---|
| JP | 64-12955 U | 1/1989 |
| JP | 2009-2495 A | 1/2009 |
| JP | 2009-13830 A | 1/2009 |

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

Provided is a simple-structured tensioner that can ensure a smooth flow of oil while enabling a reduction in the production cost. A tensioner 10 includes a plunger 30 provided with a plunger through hole 32 extending from an outer circumferential surface to an inner circumferential surface of the plunger 30, and a tensioner body 20 provided with an oil supply hole 25 extending from an outer wall of the tensioner body 20 to the plunger bore 21. The oil supply hole 25 is formed in an elongated shape that extends along a protruding direction of the plunger.

3 Claims, 10 Drawing Sheets

(56) References Cited

U.S. PATENT DOCUMENTS

| | | | |
|---|---|---|---|
| 2013/0324337 A1* | 12/2013 | Yoshida | F16H 7/08 474/110 |
| 2014/0100068 A1* | 4/2014 | Kurematsu | F16H 7/08 474/110 |
| 2014/0200104 A1* | 7/2014 | Kurematsu | F16H 7/08 474/110 |
| 2015/0292602 A1* | 10/2015 | Kurematsu | F16H 7/08 474/110 |

* cited by examiner

TENSIONER

BACKGROUND OF THE INVENTION

1. Field of the Invention

The present invention relates to a tensioner used for applying appropriate tension to a transmission belt or a transmission chain in a timing system or the like of an engine.

2. Description of the Related Art

It has been common practice to use a tensioner for maintaining appropriate tension in the chain or the like. For example, a known chain guide mechanism, which uses a tensioner lever to slidably guide a transmission chain such as an endless roller chain passing over respective sprockets of a crankshaft and a cam shaft inside an engine room, uses a tensioner for biasing the tensioner lever, in order to maintain appropriate tension.

The known tensioner 510 used in such a chain guide mechanism includes, for example, as shown schematically in FIG. 9, a tensioner body 520 having a cylindrical plunger bore 521 with an open end, a cylindrical plunger 530 in the plunger bore 521 to slide against the cylindrical surface 521a of the plunger bore 521, and biasing unit for biasing the plunger 530 in a direction in which the plunger protrudes. The biasing unit are a coil spring 540 accommodated inside a cylindrical recess 534 in the cylindrical plunger 530 and compressed between the plunger and the bottom 521b of the plunger bore 521.

Oil is supplied from an oil supply hole 525 formed in the tensioner body 520, so that an oil pressure chamber 511 formed between the plunger bore 521 and the plunger 530 is filled with oil. This oil biases the plunger 530 in the protruding direction of the plunger. A check valve 550 (schematically shown only as a check ball) stops the oil from flowing out from the oil supply hole 525. As the plunger 530 reciprocates, oil flows through the small gap between the plunger 530 and the plunger bore 521, and the flow resistance provides the damping effect of slowing down the reciprocal movement of the plunger 530.

In such a known tensioner 510, when let stand for a long time after the oil supply is stopped (in the case with an engine, after the engine is stopped), there is a time lag before oil is supplied immediately after the next start-up, and because the oil in the oil pressure chamber 511 leaks out and no oil is replenished even when the plunger 530 moves back and forth, there occurs a shortage of oil in the oil pressure chamber 511. Because of this shortage of oil, the damping force of the oil does not act on the plunger 530, which sometimes lead to large vibration of and abnormal noise in the transmission chain, or may damage the transmission chain.

Therefore, a tensioner 610 is known (see Japanese Patent Application Laid-open No. 2009-002495, for example), which is designed to have an oil reservoir chamber 631 inside the plunger 630 to supply oil into the oil pressure chamber 611 from the oil reservoir chamber 631, as shown in FIG. 10. A constant amount of oil is retained in the oil reservoir chamber 631 such as not to leak out, so that, even immediately after the start-up after a long stop, oil remaining in the oil reservoir chamber 631 is supplied to the oil pressure chamber 611, to maintain the damping force of oil for the plunger 630 and to prevent vibration or damage of the chain.

In this tensioner 610 described in Japanese Patent Application Laid-open No. 2009-002495, as shown in FIG. 10, an oil supply hole 625 is formed in the tensioner body 620 such as to extend from the outer wall of the tensioner body 620 to the plunger bore 621. A connection/adjustment groove 636 is formed in the outer circumferential surface of the plunger 630 so as to provide an oil passage 635 between the inner circumferential surface of the plunger bore 621 and the outer circumferential surface of the plunger 630. A plunger through hole 632 is formed in the plunger 630 such as to extend from the connection/adjustment groove 636 to the oil reservoir chamber 631 inside the plunger 630. This way, oil is supplied from the outside of the tensioner body 620 into the oil reservoir chamber 631 via the oil supply hole 625, oil passage 635, and plunger through hole 632.

SUMMARY OF THE INVENTION

However, in order to form the oil passage 635 between the oil supply hole 625 and the plunger through hole 632 in the tensioner 610 described in Japanese Patent Application Laid-open No. 2009-002495, the connection/adjustment groove 636 is formed in the outer circumferential surface of the cylindrical plunger 630 by a face milling process, as shown in FIG. 10 or FIG. 11. In addition to the problem that such a face milling process is costly, the length of the oil passage changes with the change in the distance between the oil supply hole 625 and the plunger through hole 632 in accordance with the protruding position of the plunger 630 relative to the tensioner body 620, because of which the flow resistance of incoming oil varies. Any design attempt to achieve a larger amount of oil is hampered by a limit to the width W of the connection/adjustment groove 636 determined by design dimensions, and therefore there is a limit to the amount of oil that can be secured.

Moreover, when rack teeth 633 are formed in the outer circumferential surface of the plunger 630 to mate with a ratchet (not shown) as with the tensioner 610 described in Japanese Patent Application Laid-open No. 2009-002495, forming the connection/adjustment groove 636 in the outer circumferential surface of the plunger 630 creates a narrow portion as denoted by A in FIG. 11 on the outer circumferential surface of the plunger 630. This can lead to local wear on the outer circumferential surface of the plunger 630 and the inner circumferential surface of the plunger bore 621 and may deteriorate the functions of the tensioner 610 particularly in engines where the tensioner is subjected to a harsh environment of use, such as oil leakage through the locally worn off portions.

The present invention is directed at solving these problems and it is an object of the invention to provide a simple-structured tensioner that can ensure a smooth flow of oil while enabling a reduction in the production cost.

The tensioner according to the present invention includes a tensioner body having a cylindrical plunger bore with an open end, a cylindrical plunger slidably inserted into the plunger bore, and biasing unit for biasing the plunger in a protruding direction of the plunger, the plunger being provided with a plunger through hole that extends from an outer circumferential surface of the plunger to an inner circumferential surface thereof, the tensioner body being provided with an oil supply hole that extends from an outer wall of the tensioner body to the plunger bore, and the oil supply hole being formed in an elongated shape that extends along the protruding direction of the plunger, whereby the above problems are resolved.

According to one form of the present invention, the plunger is provided with a plunger through hole that extends from an outer circumferential surface of the plunger to an inner circumferential surface thereof, the tensioner body is provided with an oil supply hole that extends from an outer wall of the tensioner body to the plunger bore, and the oil supply hole is formed in an elongated shape that extends along the protruding direction of the plunger. This can reduce the change in the length of the oil passage wherever the protruding plunger is positioned relative to the tensioner body, so that fluctuations of flow resistance of incoming oil can be prevented. Also, a sufficient amount of oil can be readily secured by adjusting the sizes of the oil supply hole and the plunger through hole.

Since a costly process such as face milling can be avoided, the production cost can be reduced. Even if rack teeth are formed in the outer circumferential surface of the plunger to mate with a ratchet, such rack teeth can be formed without creating a narrow portion on the outer circumferential surface of the plunger. Therefore, progression of local wear in the outer circumferential surface of the plunger and in the inner circumferential surface of the plunger bore can be prevented.

According to another form of the present invention, the oil supply hole has a lateral width that is larger than the lateral width of the plunger through hole. Therefore, even if the plunger shifts slightly in the circumferential direction of the tensioner body, the plunger through hole can be kept entirely faced with the oil supply hole, so that fluctuations in the flow resistance of incoming oil and oil flow amount are prevented.

According to another form of the present invention, a dimension of the oil supply hole along the protruding direction of the plunger is set to be larger than a stroke of the plunger relative to the tensioner body. Therefore, oil can be supplied into the plunger favorably both when the plunger is protruded to the foremost end of the protruding direction of the plunger, and when the plunger is retracted to the rearmost end of the protruding direction.

According to another form of the present invention, the tensioner further includes a ratchet pivotably supported on the tensioner body and having a ratchet claw that mates with the plunger. Therefore, the ratchet can not only restrict the movement of the plunger in the protruding direction of the plunger, but also function as anti-rotation means for restricting rotation of the plunger relative to the tensioner body. This way, the oil supply hole and the plunger through hole can be kept faced with each other with a simple structure.

DESCRIPTION OF THE PREFERRED EMBODIMENTS

A tensioner 10 according to one embodiment of the present invention will be described with reference to the drawings.

Figure 1:
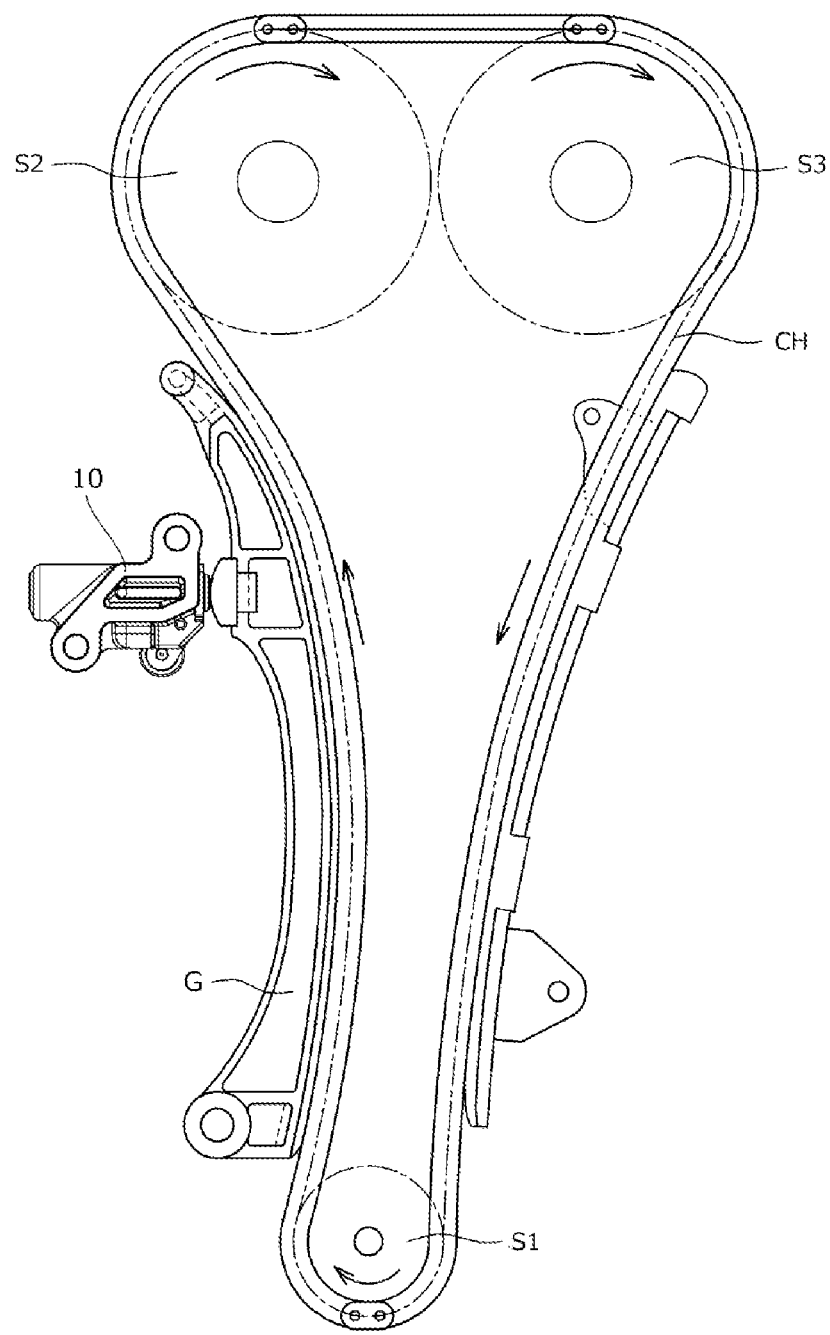
FIG. 1 is an explanatory diagram illustrating one form of a tensioner in use according to one embodiment of the present invention.

First, the tensioner 10 of this embodiment is incorporated in a chain transmission used in a timing system or the like of an engine, in order to apply appropriate tension to the slack side of a transmission chain CH passing over a plurality of sprockets S1 to S3 as shown in FIG. 1 with a tensioner lever G to reduce vibration during the drive.

The tensioner 10 includes, as shown in FIG. 2 to FIG. 5, a tensioner body 20 having a plunger bore 21, a cylindrical plunger 30 slidably inserted into the plunger bore 21, a coil spring 40 that is biasing unit for biasing the plunger 30 in a direction in which the plunger protrudes, a check valve 50 disposed inside the plunger 30, a ratchet 60 pivotably attached to the tensioner body 20, and a stopper lever 70 and stopper pin 71 that temporarily stop the plunger 30 from protruding out.

Hereinafter, various constituent elements of the tensioner 10 will be described with reference to the drawings.

Figure 4:
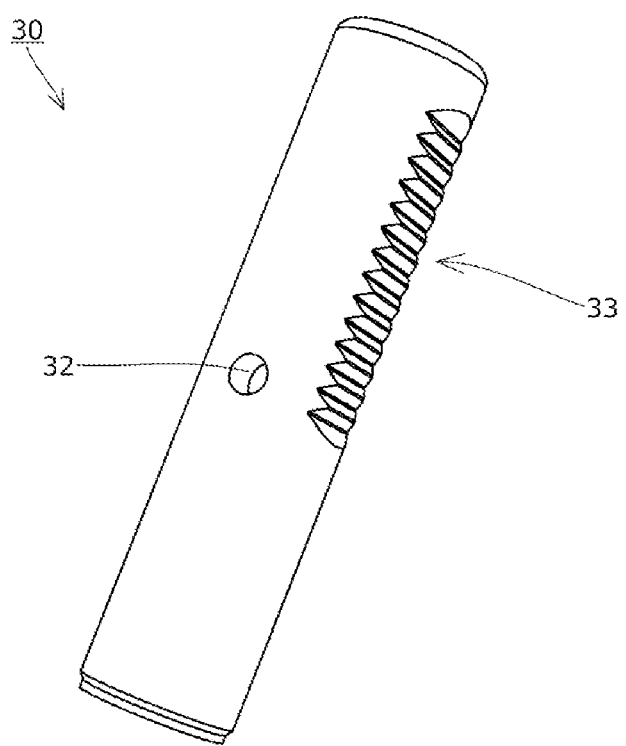
FIG. 4 is a perspective view illustrating a plunger.
Figure 5:
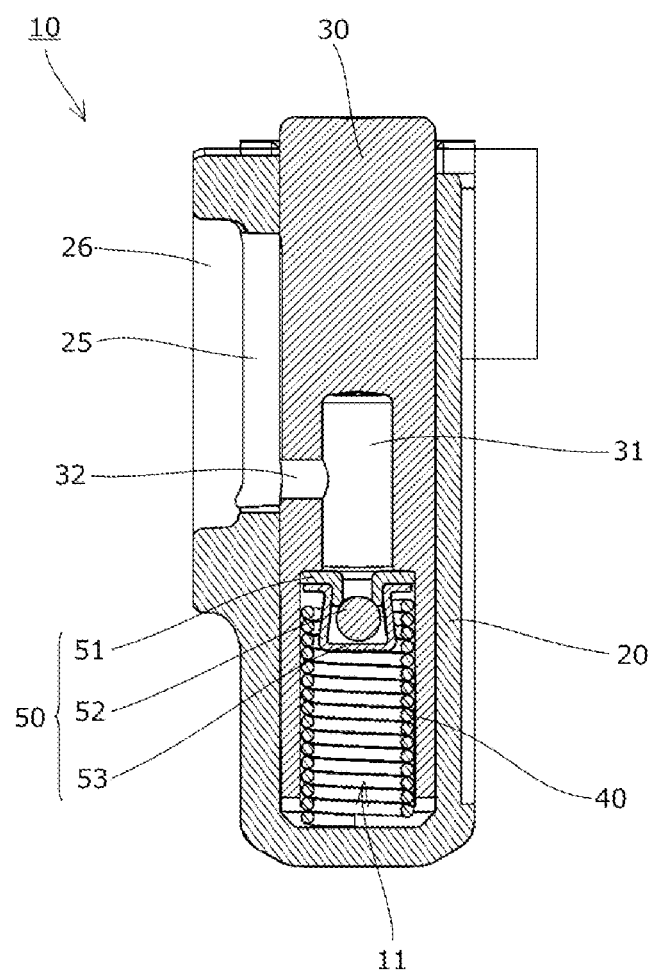
FIG. 5 is a cross-sectional view illustrating the tensioner.

The check valve 50 is disposed inside the plunger 30 as shown in FIG. 5, with an oil reservoir chamber 31 being formed on the protruding side of the plunger. A plunger through hole 32 is formed in the plunger 30, as shown in FIG. 4 and FIG. 5, which is in the form of a round hole and extends from an outer circumferential surface of the plunger 30 to the inner circumferential surface to reach the oil reservoir chamber 31. Rack teeth 33 are formed in the outer circumferential surface of the plunger 30 to mate with the ratchet 60.

Figure 3:
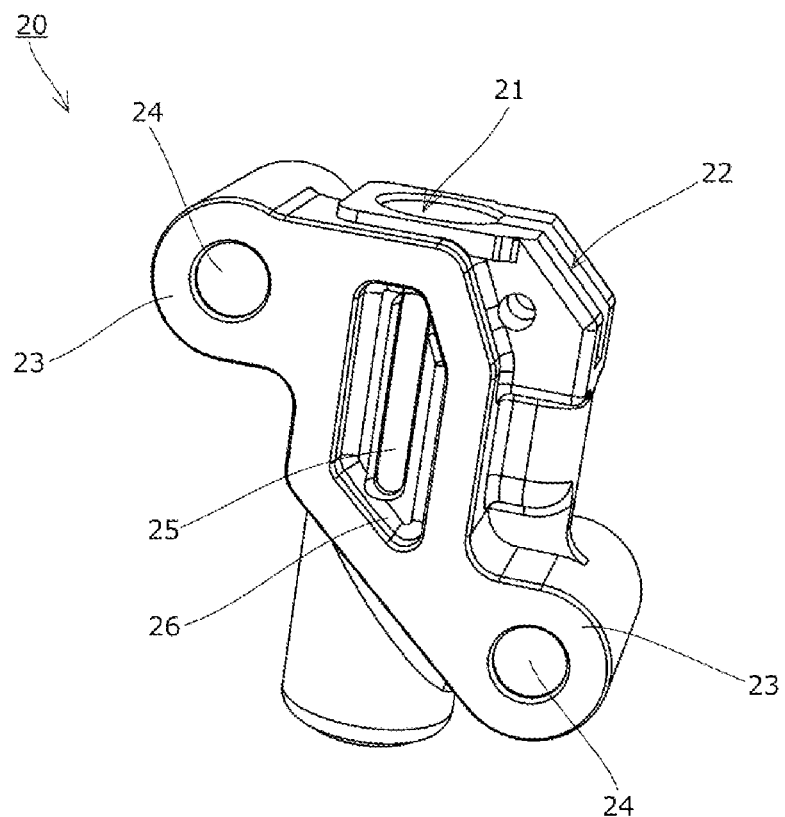
FIG. 3 is a perspective view illustrating a tensioner body.

The tensioner body 20 is provided with a cylindrical plunger bore 21 with an open end, and a ratchet holder recess 22 in which the ratchet 60 is disposed, as shown in FIG. 3. The tensioner body 20 has an attachment part 23 with an attachment hole 24. A bolt or the like is passed through this attachment hole 24 to securely attach the tensioner body 20 to an attachment target such as an engine block (not shown).

In the side face of the tensioner body 20 opposite the engine block (not shown) are formed an oil introducing cavity 26 for guiding oil supplied from the engine block side (not shown), and an oil supply hole 25 that extends from the outer wall of the tensioner body 20 (bottom of the oil introducing cavity 26) to the plunger bore 21, as shown in FIG. 3. This oil supply hole 25 is formed in the shape of an elongated hole extending along the direction in which the plunger protrudes, and connected to an oil pump (not shown) provided in the engine (not shown), when the tensioner body is attached to the engine block (not shown).

Figure 6:
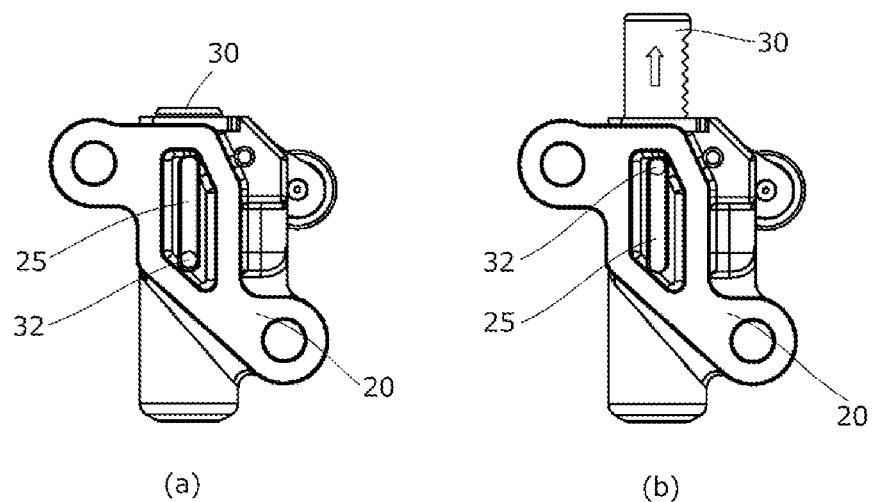
FIG. 6 is an explanatory diagram illustrating an accommodated state and a protruding state of the plunger.

The length of the oil supply hole 25 along the protruding direction of the plunger is set longer than the stroke of the plunger 30 relative to the tensioner body 20, so that the plunger through hole 32 can be faced with the oil supply hole 25 both when the plunger 30 is retracted to the rearmost end in the plunger protruding direction relative to the tensioner body 20 as shown in FIG. 6A, and when the plunger 30 is protruded to the foremost end in the plunger protruding direction relative to the tensioner body 20 as shown in FIG. 6B. The lateral width (circumferential width) of the oil supply hole 25 is formed larger than the lateral width of the plunger through hole 32.

The coil spring 40 is accommodated inside the oil pressure chamber 11 that is formed between the plunger bore 21 and the rear end of the plunger 30 such as to be able to expand and contract as shown in FIG. 5, and configured such that one end of the spring is seated on the bottom of the plunger bore 21 while the other end is seated on the outer peripheral surface of a retainer 53 of the check valve 50.

The check valve 50 allows the oil to flow from the oil reservoir chamber 31 into the oil pressure chamber 11 while stopping the oil from flowing from the oil pressure chamber 11 into the oil reservoir chamber 31. As shown in FIG. 5, the check valve is made up of a ball seat 51, a check ball 52 capable of making tight contact with the oil passage in the ball seat 51, and the retainer 53 that guides the check ball 52.

Figure 2:
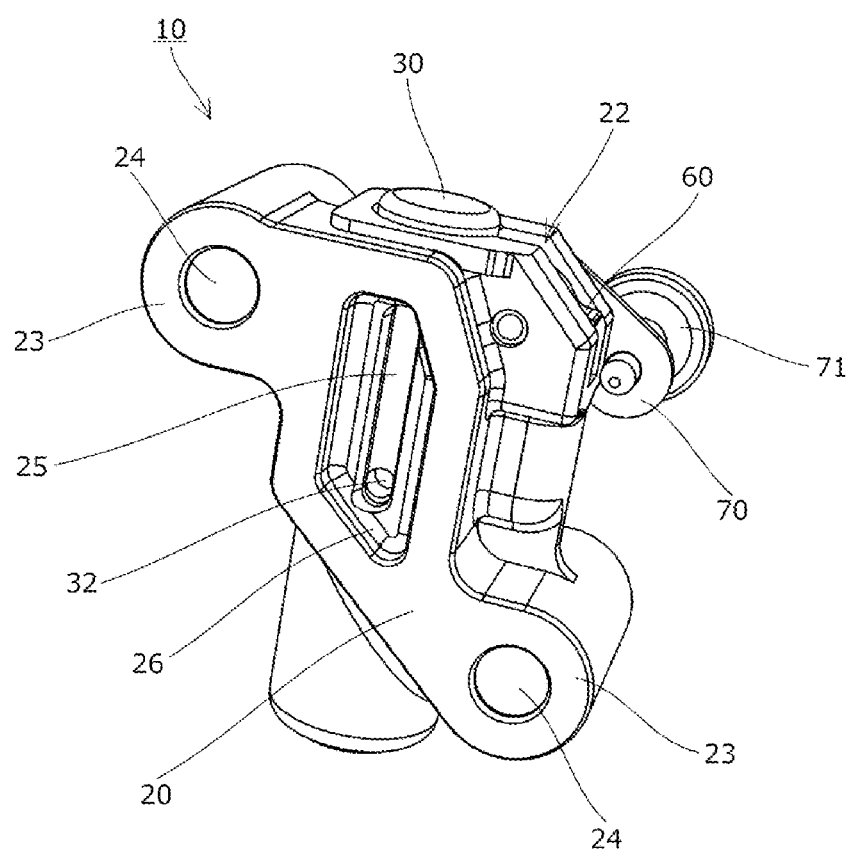
FIG. 2 is a perspective view illustrating the tensioner.

As shown in FIG. 2, the ratchet 60 is configured to include a ratchet claw (not shown) capable of mating with the rack teeth 33, which is biased with biasing unit (not shown) so that the ratchet claw (not shown) mates with the rack teeth 33 of the plunger 30 and restricts the movement of the plunger 30 toward the side where the plunger is accommodated. The ratchet 60 functions also as anti-rotation means for restricting rotation of the plunger 30 relative to the tensioner body 20 by engagement between the rack teeth 33 of the plunger 30 and the ratchet claw (not shown).

Next, a first variation example of the tensioner 10 will be described with reference to FIG. 7.

Figure 7:
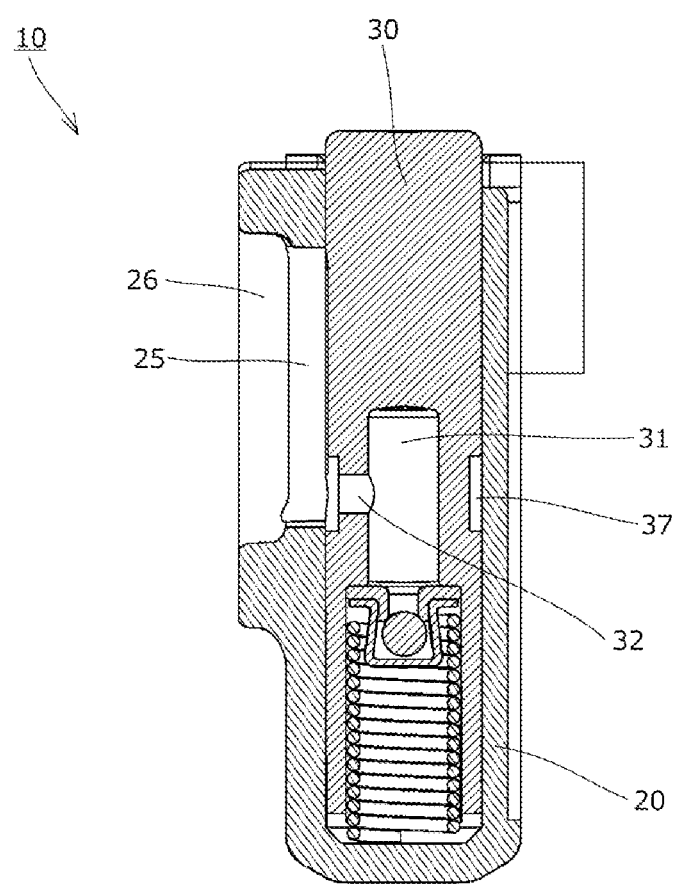
FIG. 7 is a cross-sectional view illustrating the tensioner according to a first variation example.

In the tensioner 10 shown in FIG. 7, the ratchet 60 is not provided, so that the plunger 30 is rotatable relative to the tensioner body 20 around the axial line of the plunger 30.

A plunger-side circumferential groove 37 that is in communication with the plunger through hole 32 is formed all around in the outer circumferential surface of the plunger 30 as shown in FIG. 7, whereby the plunger through hole 32 can communicate with the oil supply hole 25 irrespective of the phase in the rotating direction of the plunger 30 relative to the tensioner body 20.

Next, a second variation example of the tensioner 10 will be described with reference to FIG. 8.

Figure 8:
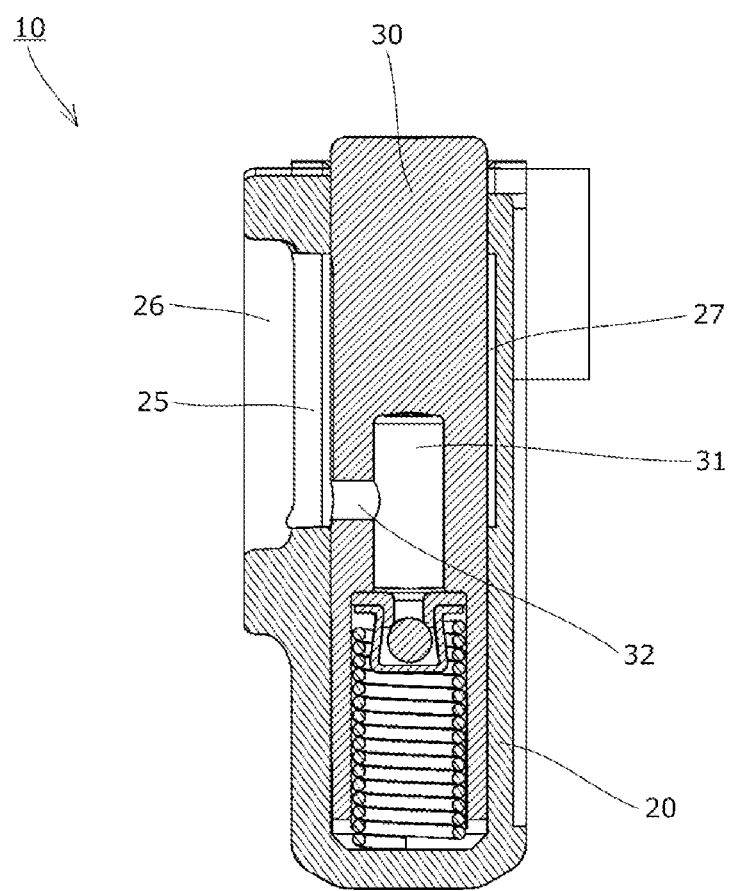
FIG. 8 is a cross-sectional view illustrating the tensioner according to a second variation example.
Figure 9:
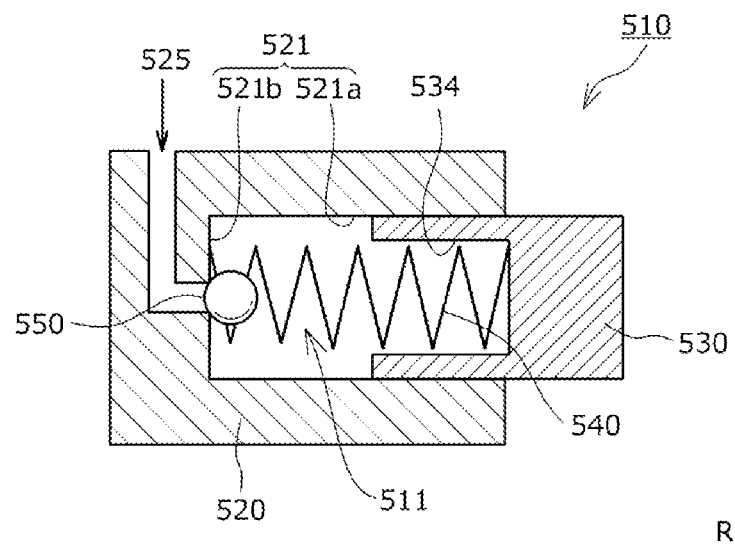
FIG. 9 is a schematic diagram illustrating a conventional tensioner.
Figure 10:
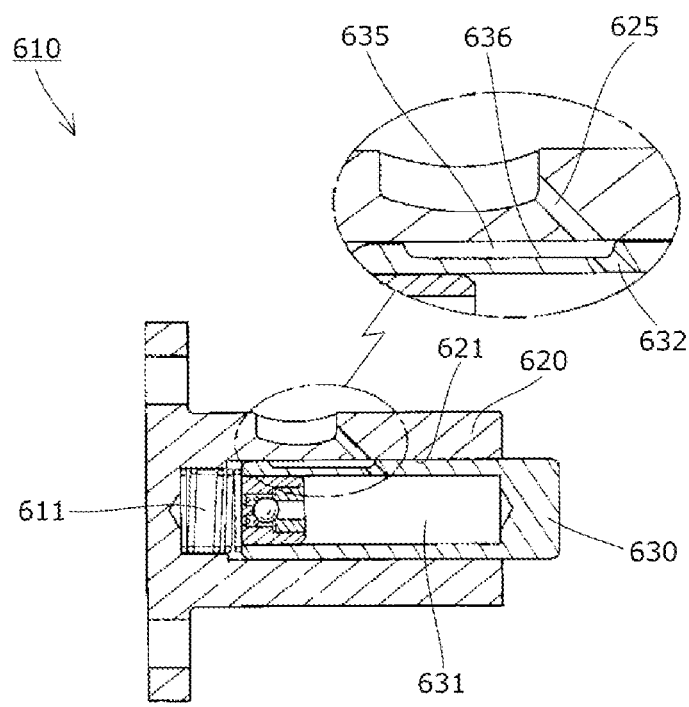
FIG. 10 is a cross-sectional view illustrating another conventional tensioner.
Figure 11:
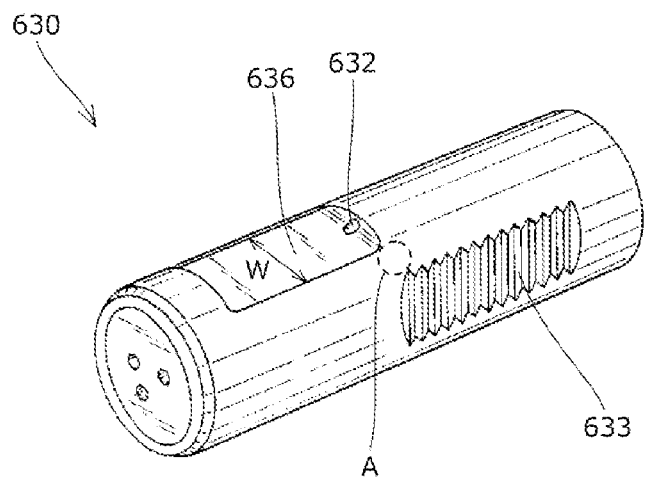
FIG. 11 is a perspective view illustrating a plunger assembled into the tensioner shown in FIG. 10.

In the tensioner 10 shown in FIG. 8, similarly to the first variation example shown in FIG. 7, the ratchet 60 is not provided, so that the plunger 30 is rotatable relative to the tensioner body 20 around the axial line of the plunger 30.

As shown in FIG. 8, a body-side circumferential groove 27 that is in communication with the oil supply hole 25 is formed all around in the inner circumferential surface of the plunger bore 21 of the tensioner body 20, whereby the plunger through hole 32 can communicate with the oil supply hole 25 irrespective of the phase in the rotating direction of the plunger 30 relative to the tensioner body 20. This body-side circumferential groove 27 may have a dimension in the plunger protruding direction that is larger than that of the oil supply hole 25.

While one embodiment of the present invention has been described in detail, the present invention is not limited to the above-described embodiment and may be carried out with various design changes without departing from the scope of the present invention set forth in the claims.

For example, while the tensioner was described as a component to be incorporated in a timing system of a car engine in the embodiment above, the purpose of use of the tensioner is not limited to this specific application.

Also, while the tensioner was described as a component that applies tension to a transmission chain via a tensioner lever in the embodiment above, the plunger can directly guide the transmission chain slidably with a distal end thereof to apply tension to the transmission chain.

The tensioner may not necessarily be applied to a transmission mechanism with a transmission chain but can also be used for similar transmission mechanisms that use belts, ropes and the like, and can be applied in a variety of industrial fields where it is required to apply tension to an elongated component.

While a ratchet that mates with the plunger is used as anti-rotation means for restricting rotation of the plunger relative to the tensioner body in the embodiment described above, an anti-rotation mechanism may be provided for the plunger separately from the ratchet, in which case the ratchet mechanism may not necessarily be provided.

What is claimed is:

1. A tensioner comprising:
a tensioner body having a cylindrical plunger bore with an open end;
a cylindrical plunger slidably inserted into the plunger bore; and
biasing unit for biasing the plunger in a protruding direction of the plunger,
the plunger being provided with a plunger through hole that extends from an outer circumferential surface of the plunger to an inner circumferential surface thereof,
the tensioner body being provided with an oil supply hole that extends from an outer wall of the tensioner body to the plunger bore, and
the oil supply hole being formed in an elongated shape that extends along the protruding direction of the plunger, and
a dimension of the oil supply hole along the protruding direction of the plunger is set to be larger than a stroke of the plunger, from a rearmost position to a foremost position of the plunger in the protruding direction, relative to the tensioner body.

2. The tensioner according to claim 1, wherein the oil supply hole has a lateral width in a circumferential direction of the cylindrical plunger bore that is larger than a lateral width of the plunger through hole.

3. The tensioner according to claim 1, further comprising a 16 ratchet pivotably supported on the tensioner body and having a ratchet claw that mates with the plunger.

* * * * *